US006792339B2

(12) United States Patent
Basson et al.

(10) Patent No.: US 6,792,339 B2
(45) Date of Patent: Sep. 14, 2004

(54) ARTIFICIAL PASSENGER WITH CONDITION SENSORS

(75) Inventors: Sara H. Basson, White Plains, NY (US); Peter G. Fairweather, Yorktown Heights, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 10/079,123

(22) Filed: Feb. 19, 2002

(65) Prior Publication Data

US 2003/0158644 A1 Aug. 21, 2003

(51) Int. Cl.$^7$ ................................................ G06F 19/00

(52) U.S. Cl. ............................ 701/1; 701/28; 348/143; 340/438

(58) Field of Search ............................... 701/49, 1, 28; 348/77, 78, 116, 135, 143, 152; 340/438, 459, 460, 461, 471, 575, 576

(56) References Cited

U.S. PATENT DOCUMENTS 4,774,570 A * 9/1988 Araki ......................... 348/154
5,061,997 A * 10/1991 Rea et al. .................... 348/143
5,986,543 A * 11/1999 Johnson ................. 340/426.19
6,236,968 B1 5/2001 Kanevsky et al. .......... 704/275
6,377,296 B1 4/2002 Zlatsin et al. ............... 348/143
6,421,453 B1 7/2002 Kanevsky et al. .......... 382/115
6,480,103 B1 * 11/2002 McCarthy et al. ....... 340/425.5
6,496,117 B2 * 12/2002 Gutta et al. ................. 340/576
6,580,973 B2 * 6/2003 Leivian et al. ................. 701/1
2002/0084902 A1 7/2002 Zadrozny et al. ........... 704/270

OTHER PUBLICATIONS

The World's No. 1 Science & Technology News Service, NewScientist.com, 1 page, Jul. 2001.

U.S. patent application Ser. No. 09/680,711, filed Oct. 6, 2002.

U.S. patent application Ser. No. 09/580,720, May 30, 2000.

* cited by examiner

*Primary Examiner*—Tan Q. Nguyen
(74) *Attorney, Agent, or Firm*—Louis J. Percello; Ryan, Mason & Lewis, LLP

(57) ABSTRACT

A situation controller for a vehicle. The situation controller includes a processing device and an image monitor coupled to the processing device, for monitoring images associated with one or more items within the vehicle. The situation controller also includes a device for communicating a message relating to the one or more monitored items wherein the content of the message is determined by the processing device based at least in part on the one or more monitored items. Additionally, a controller coupled to the processing device, for controlling at least one function of the vehicle in response to the one or more monitored items within the vehicle, is included.

28 Claims, 9 Drawing Sheets

ARTIFICIAL PASSENGER WITH CONDITION SENSORS

FIELD OF THE INVENTION

The present invention relates generally to the field of vehicle safety, and more particularly to techniques for alerting a driver to potentially hazardous situations.

BACKGROUND OF THE INVENTION

When a person locks their keys in their vehicle, they find themselves in a very frustrating and embarrassing situation. The situation is potentially dangerous if a child or pet has been left in the locked vehicle. A standard feature in automobiles alerts drivers via a beeping sound when the driver leaves a key in the ignition and opens a door. However, this standard feature does not help the driver if the keys are left elsewhere in the car (for example, on a seat, or arm rest, or in a purse).

Another common problem encountered with the use of automobiles, is that people leave their children and pets unattended in the vehicle. If the child or pet is unable to exit from the car in a timely manner the car interior may become too hot or too cold, causing injury or death to the occupants.

It is known in the art to place pressure sensors in the seats of the vehicles (including child safety seats) to detect the weight of the passengers. The output from the sensor can run to an alarm to warn the driver of the presence of an occupant within the vehicle. The sensor can also warn the driver when one of the passengers vacates the seat while the vehicle is moving. Additionally, the output of the sensor may run to an air bag control system. However, these types of sensors and notification devices do not work if the child, or other occupant, is not in the proper seat, or if the occupants gained access to the vehicle and locked themselves in. Drivers may also mistakenly leave their groceries in the vehicle. Warm weather may cause the groceries to spoil and cause the vehicle to smell if left too long.

U.S. Pat. No. 6,236,968 entitled "Sleep Prevention Dialog Based Car System" issued on May 22, 2001 in the names of Dimitri Kanevsky and Wlodek Wlodzimierz Zadrozny (referred to herein as the '968 patent) and is hereby incorporated by reference herein. The '968 patent is directed to an automatic dialog system capable of keeping a driver awake while driving during a long trip or one that extends into the late evening. The system in the '968 patent is commonly referred to as an artificial passenger. The artificial passenger is designed to carry on a conversation with the driver on various topics utilizing a natural dialog system. Through this conversation and additional features described in the patent, the artificial passenger is configured to detect when a driver is falling asleep and to emit an audible alarm signal to wake the sleeping driver.

Prior art systems, however, do not notify persons besides those in the immediate vicinity of the vehicle who can hear the speaker delivering its message from under the hood of the vehicle. Also, these prior art systems do not have the ability to take corrective actions to remedy the potentially hazardous or undesirable situations discussed herein. Thus, a need exists for a system which will provide an alert indication to a driver or owner of a vehicle when an undesirable situation is detected which also has the ability to take corrective actions to remedy the situation.

SUMMARY OF THE INVENTION

The present invention provides apparatus and techniques for providing an alarm indication to an owner or driver of a vehicle to indicate potentially hazardous or undesirable conditions. An advantage of the present invention is that it is configured to monitor the environment of a vehicle and provide an alarm indication to an owner or driver of the vehicle regardless of the location of the owner or driver. Additionally, the present invention is configured to have the ability to take preventative and/or corrective actions with respect to the potentially hazardous or undesirable situation.

Accordingly, in a first aspect of the present invention, a situation controller for a vehicle is provided. The situation controller includes a processing device and an image monitor coupled to the processing device, for monitoring images associated with one or more items within the vehicle. The situation controller also includes a device for communicating a message relating to the one or more monitored items wherein the content of the message is determined by the processing device based at least in part on the one or more monitored items. Additionally, a controller coupled to the processing device, for controlling at least one function of the vehicle in response to the one or more monitored items within the vehicle, is included.

In a second aspect of the present invention, a camera system is combined with an artificial passenger system (also referred to herein as a "vehicle system situation controller" or "situation controller") to monitor an environment of a vehicle and provide an alarm indication to the owner. The camera system identifies the position of keys, for example, and notifies the driver that he or she has left the keys in a particular spot in the vehicle. Thus, the present invention will warn the driver against accidentally locking the keys in the car.

In accordance with a third aspect of the present invention, the artificial passenger is connected to a temperature indicator to analyze the temperature in the vehicle. Thus, in combination with the camera, the artificial passenger is able to determine that a child or pet has been left in a vehicle that it is beginning to get very hot or cold. If the temperature gets too hot or too cool inside the vehicle, the artificial passenger has several options including sending a message to the owner/driver, calling the owner's phone or beeper, calling the police, opening a window or a door, and sounding an alarm to get the attention of people walking by the vehicle (as well as allowing them to open the door to help the occupant). The artificial passenger is able to analyze the situation and execute a corrective action, which includes opening a window or a door to allow the temperature to moderate or to allow the child or pet to leave the vehicle, after the artificial passenger has notified the driver or authorities.

In a fourth aspect of the present invention, the artificial passenger is configured to analyze the situation to determine, for example, whether groceries were left in the vehicle. If the owner did not remove all of the groceries, the artificial passenger will call the owner and tell him or her that the groceries were left in the vehicle. The artificial passenger utilizes an odor detector or sensor as well as the camera to detect whether groceries were left in the vehicle.

In accordance with a fifth aspect of the invention, a communication system that interacts with the owner of the vehicle from a remote location is provided. The communication system utilizes, for example, the Internet and/or a global positioning system (GPS) to locate and communicate with the vehicle owner. Through the communication system, the owner can, for example, open a vehicle door remotely such that a person can enter the locked vehicle.

These and other objects, features and advantages of the present invention will become apparent from the following detailed description of illustrative embodiments, which is to be read in connection with the accompanying drawings.

BRIEF DESCRIPTION OF THE DRAWINGS

For a better understanding of the invention, reference is made to the following description of exemplary embodiments thereof, and to the accompanying drawings, wherein.

DETAILED DESCRIPTION OF PREFERRED EMBODIMENTS

Figure 1:
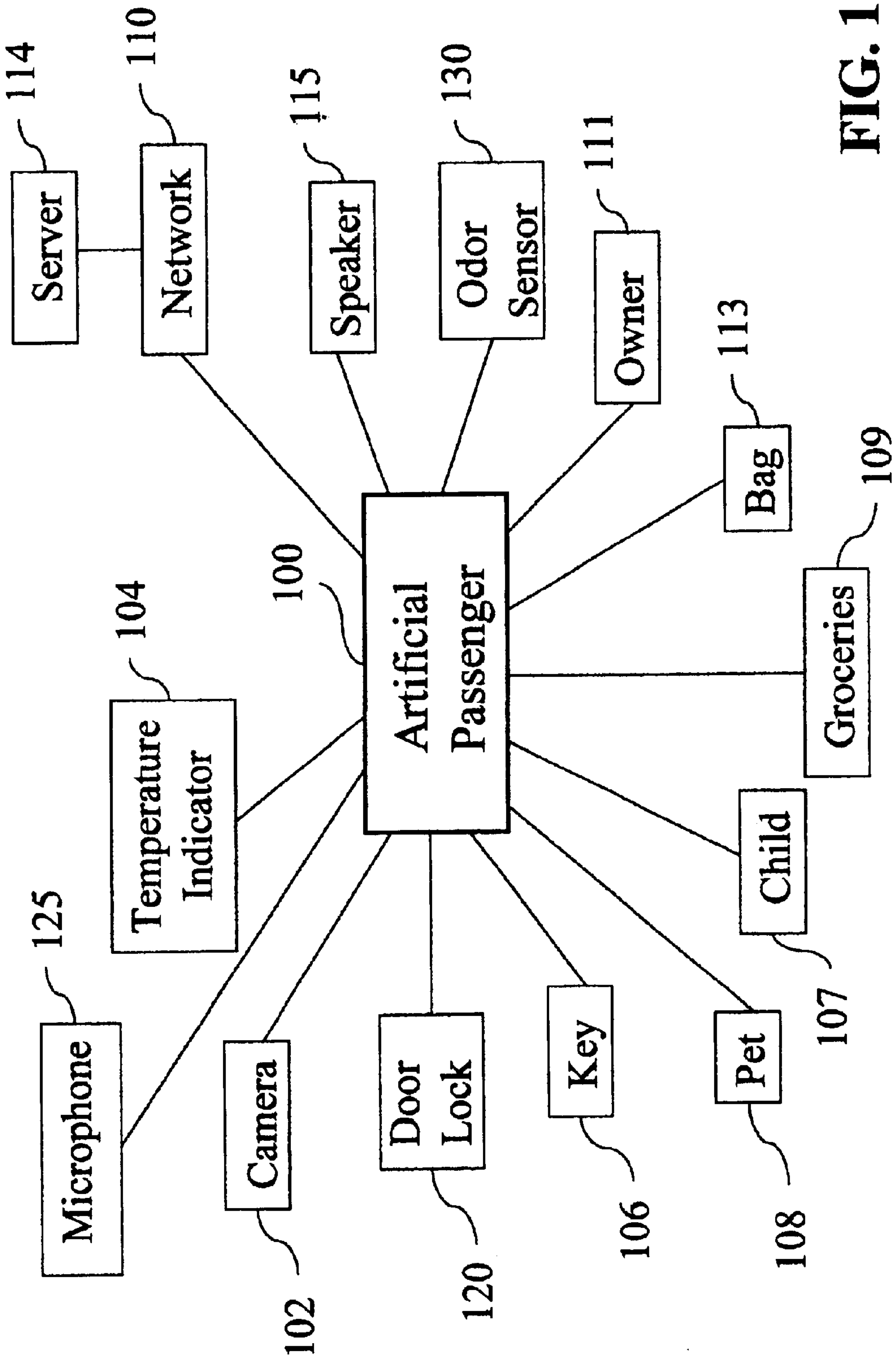
FIG. 1 is a block diagram illustrating exemplary elements of the invention.

Referring now in specific detail to the drawings in which like reference numerals identify similar or identical elements throughout the several views, and initially to FIG. 1, one embodiment of an artificial passenger system and associated components in accordance with the present disclosure is shown.

Basic features of an artificial passenger are described in the '968 patent. FIG. 1 is a block diagram illustrating an artificial passenger 100 and related components in accordance with an illustrative embodiment of the present invention. As illustrated in FIG. 1, artificial passenger 100 is operatively connected to at least one image monitor such as camera 102 that observes and monitors items that are located in a vehicle, such as, for example, a key 106, a child 107, a pet 108, and groceries 109. It is contemplated that the term "vehicle" as used herein applies to all vehicles, such as, cars, limousines, buses, trucks, trains, boats, airplanes, etc. Preferably, there are a plurality of cameras 102 positioned at various vantage points throughout the vehicle to provide full coverage of the items located in the vehicle.

Artificial passenger 100 is capable of executing applications in a processor associated therewith. For example, artificial passenger 100 executes an application that allows it to recognize the presence of objects such as the key 106 and child 107, while also analyzing the environment within which the objects are located. That is, artificial passenger 100 is capable of determining whether a key left on an arm rest is the key to the vehicle as opposed to the house key, by tracking the path of the key from removal of the key from the ignition to its placement on the arm rest. Co-pending U.S. patent application Ser. No. 09/238,845, filed on Jan. 28, 1999 and entitled "A Virtual Map System and Method for Tracking Objects" describes a technique for performing the tracking function and is hereby incorporated by reference herein. Additionally, artificial passenger 100 is configured to analyze more complicated situations, such as, for example, a situation wherein the key 106 is removed from the automobile's ignition and is placed in a purse or bag 113, and then bag 113 is left in the vehicle.

In accordance with another embodiment of the present invention, artificial passenger 100 is configured to analyze the environmental conditions within the vehicle and to determine whether those conditions are safe for a child or pet. For example, where a pet has been left in the vehicle, artificial passenger 100 is configured to monitor the temperature in the vehicle via temperature indicator 104, to determine whether the temperature within the vehicle has exceeded a predetermined temperature level which represents a safety and/or comfort level for the child or pet. Additionally, the artificial passenger 100 is capable of determining whether the pet appears to be irritable (for example, through continuous movement, crying or barking) which may be an indication that the pet needs to go to the bathroom. Artificial passenger 100 then sends a message via a network 110 to an owner 111, informing him or her that the pet is irritable and may need to go to the bathroom.

It is contemplated that artificial passenger 100 sends a message through the network 110 which is connected to a server 114 that is capable of locating and sending a message to the owner 111. The server may utilize means known to one having ordinary skill in the art, to locate and communicate with the owner 111 (e.g., through GPS or by cellular telephone). For example, co-pending U.S. patent application Ser. No. 09/580,720, filed May 30, 2000 and entitled "Intelligent Agent Authentication via Position Locator System," and co-pending U.S. patent application Ser. No. 09/680,711, filed Oct. 6, 2002 and entitled "Efficient Communication With Passive Devices," describe exemplary methods that may be used to locate a person. Thus, the system is capable of sending a message to the owner of the vehicle to indicate that something or someone was left in the vehicle, or that forgotten groceries may be spoiling. It is contemplated that the network 110 includes an interactive communication system that is capable of communication with one or more persons to control the situation in one or more automobiles.

In response to potentially harmful or otherwise adverse conditions within the vehicle, the artificial passenger 100 is configured to perform several different functions to remedy the undesirable condition subsequent to sounding an alarm indication via speaker 115. For example, the artificial passenger 100 is capable of unlocking the door lock 120 and/or opening a door to let a child or pet out or to allow the owner 111 to retrieve a key 106 that was locked in the vehicle. Additionally, the artificial passenger 100 is capable of opening a window to vent the vehicle if the interior temperature gets too high for the safety of the child or pet. It may be a prerequisite for the artificial passenger 100 to have to get permission from the owner 111 prior to opening the door or window of the vehicle.

The artificial passenger 100 is also configured to identify people within or outside of the vehicle through image or voice processing techniques known to one having ordinary skill in the art. Therefore, the artificial passenger can identify a person outside of the car to the owner so that the owner 111 can make an informed decision prior to allowing the artificial passenger 100 to open a window or door. Additionally, if the owner is in another location and another person requires access to the interior of the vehicle, the artificial passenger 100 is configured to communicate a message from the other person to the owner 111 to request permission from the owner to permit access to the vehicle. For example, the artificial passenger 100 is configured to transmit a question from a person via speech recognition software and external microphones 125. If, in response to the question transmitted by the artificial passenger 100, the owner gives permission to open the vehicle door, then the artificial passenger 100 will open the door. Artificial passenger 100 will continue to monitor the activity of the person and make sure that the door is closed and locked after the person is done. If the person does not close the door, the artificial passenger 100 will close the door or initiate an alarm indication.

The odor sensor 130 is configured to identify the smell of food and, especially, rotting food. If such an odor is detected, the artificial passenger 100 transmits a message to the owner 111 indicating that food or groceries 109 have been left in the vehicle.

Figure 2:
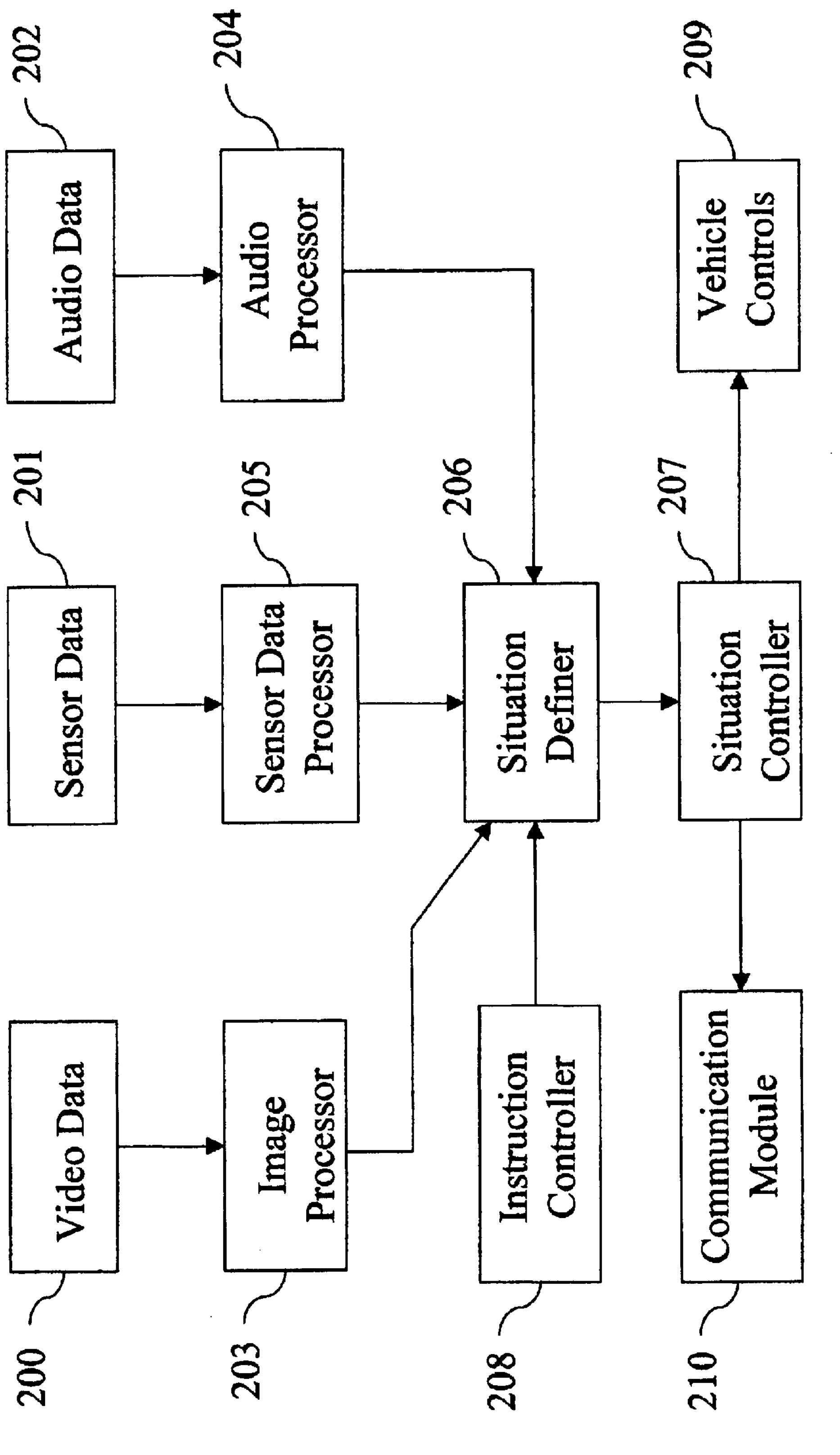
FIG. 2 is a block diagram illustrating components associated with the artificial passenger in accordance with the present invention.

Referring now to FIG. 2, various devices and information that are utilized with the artificial passenger 100 are illustrated. The artificial passenger 100 receives video data 200, sensor data 201 and audio data 202. The artificial passenger 100 includes an image processor 203, an audio processor 204, a sensor data processor 205, a situation definer 206, a situation controller 207 an instruction controller 208 and a communication module 210.

Video data 200 is obtained from the camera 102. Sensor data 201 is obtained from at least one of a plurality of sensors such as a temperature indicator 104, a motion sensor, and biosensors on pets, children and handicapped persons. For example, if a mother lets her child sleep in a baby seat after they have arrived at home, to prevent disturbing the baby, the biosensors (e.g., utilizing electrocardiograph (EKG) technology) transmit a signal to the mother to indicate that her child woke up. Audio data 202 enters the system via microphone 125.

The video data 200 is routed to the image processor 203 that reformats the video data into a format that can be analyzed by image recognition devices that function as described, for example, in co-pending U.S. patent application Ser. No. 09/079,754, entitled "Apparatus and Method for User Recognition Employing Behavioral Passwords" and filed on May 15, 1998 which is hereby incorporated by reference herein (referred to herein as the '754 application). The image processing feature performed by processor 203 determines, for example, whether an image represents a child, a dog, an older person, keys, or a purse. Equipment associated with the image processing is also capable of tracking the position of various items in a space continuum, such as vehicle keys and purses. The user may designate additional items for observation and tracking by the cameras associated with the artificial passenger 100.

The situation definer 206 utilizes video data, sensor data, and audio data to process and understand situations. For example, situation definer 206 checks that keys were not left in the vehicle as the door is closing, no children or pets remain in the vehicle as the door is closing, and children and pets are not in the vehicle with closed windows on a hot day. The situation definer 206 also utilizes the audio data 202 processed by the audio processing 204 in conjunction with speech recognition techniques to understand what an owner or child may be saying and what they may be feeling. See, for example, co-pending U.S. patent application Ser. No. 09/751,504, entitled "Translator for Infant and Toddlers," filed on Dec. 29, 2000 which is hereby incorporated by reference herein, which describes a process of analyzing toddler and infant responses to various situations. This information is also useful to the driver when the driver is driving. That is, the artificial passenger 100 assists the driver in monitoring the child, thereby reducing the number of times that the driver needs to turn around and the chances of getting into an accident.

Audio processing 204 is capable of identifying noise, such as, for example, the sound of a door slamming, as well as understanding the commands of a driver/owner. This information will assist situation definer 206 in understanding a situation. The situation definer 206 can alert a driver to a situation where, for instance, a child reaches its arm or a piece of clothing out of the window. Additionally, the situation definer 206 receives data from the sensor data processor 205 that includes data such as, for example, the temperature inside and/or outside of the vehicle, the humidity inside and/or outside of the vehicle, and data regarding the quantity of dusts, pollens, carbon monoxide and other irritants that may reside in the vehicle and are otherwise invisible to the human eye. If, for example, artificial passenger 100 knows that a child may be allergic to something, it can test the environment within the vehicle to determine the irritant levels and notify the driver about the results.

Situation definer 206 is connected to instruction controller 208 that defines a hierarchy of relevant importance associated with the various situations that are encountered by the situation definer 206. For example, the instruction controller 208 requires the artificial passenger 100 system to monitor whether a child is left in the vehicle. Or, for example, an ill person may be allergic to a particular allergen that is in the vehicle environment. If the sensor data processor 205 notices that the vehicle is driving by a chemical factory, then the instruction controller 208 will notify the driver to monitor the air quality and the artificial passenger 100 will temporarily close the windows and vents of the vehicle to prevent fumes or noxious chemicals from entering the vehicle environment.

The instruction controller 208 is connected to a communication module 210 which is connected to the network 110, to allow the artificial passenger 100 to contact the owner 111, the authorities in an emergency, or to access other types of data from remote sources such as other vehicles. That is, if a defect is detected in another vehicle of the same make and model, the artificial passenger 100 will be informed of the defect via another artificial passenger that also has access to the network. Thus, artificial passenger 100 will be prepared for any adverse affects resulting from the defect and will compensate accordingly. Additionally, if a defect was detected in another vehicle of the same make and model and broadcasted over the Internet via a communication module, the instruction controller 208 will analyze the situation within its own vehicle and notify the owner.

Situation controller 207 recommends which action should be taken once the nature of the situation has been defined. Situation controller 207 is connected to the vehicle controls 209 to, for example, open a door or a window, warn the driver, or initiate an alarm indication. Situation controller 207 is also connected to the communication module 210 to send information or an alarm indication to the proper authorities. The communication module 210 allows the owner to connect to the artificial passenger 100 via telephone, e-mail, pager, or other communication devices.

Figure 3:
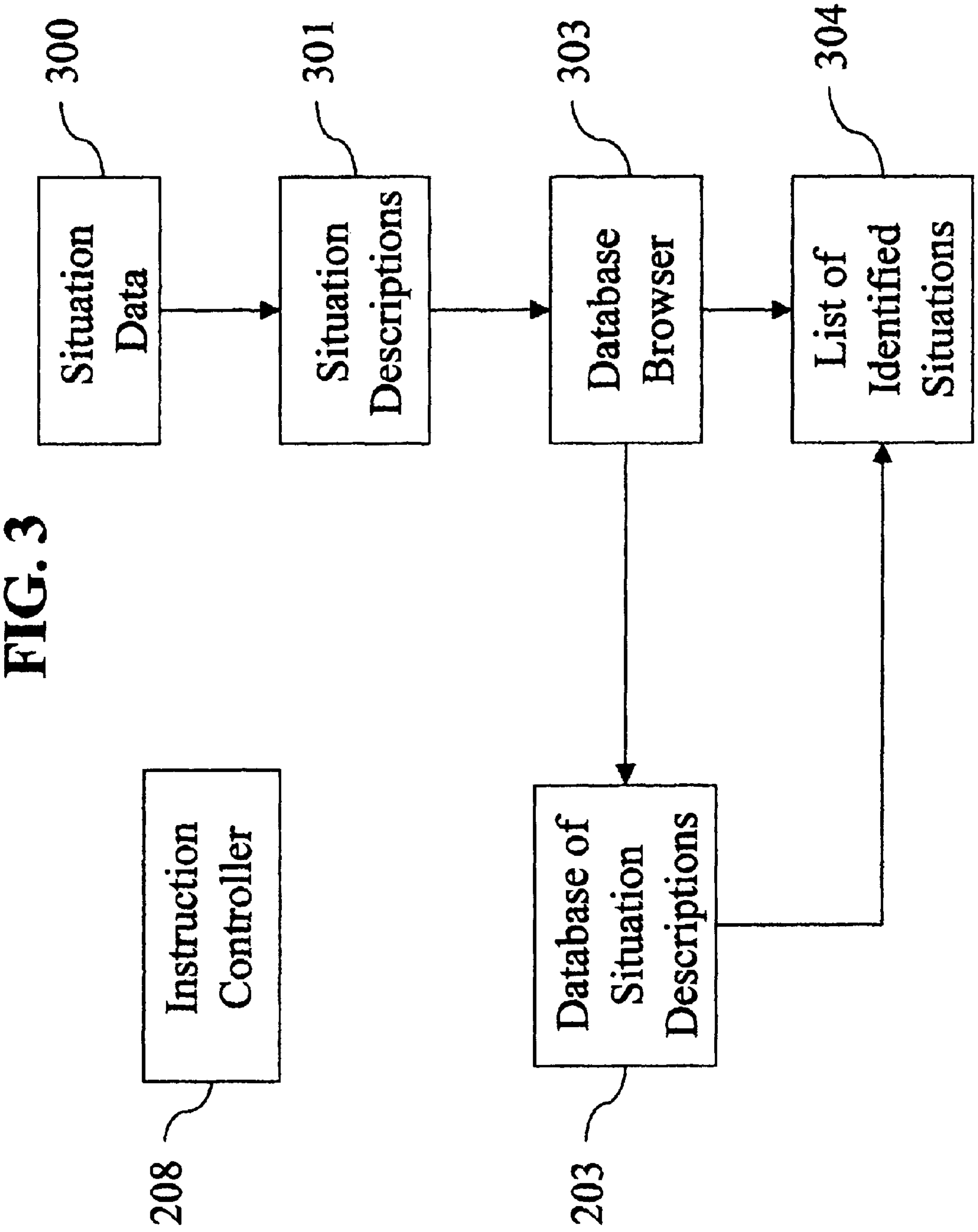
FIG. 3 is a block diagram illustrating components associated with a situation definer.

FIG. 3 is a block diagram illustrating components associated with the situation definer 206. The situation definer 206 obtains data 300 from various data processors such as, for example, the image processor 203, the audio processor 204 and the sensor data processor 205. Situation descriptions 301 are provided in accordance with current data by attributing characteristics to several objects. For example, situation descriptions 301 describe a situation where keys are being moved from one place to another (a seat perhaps), or a child is sitting in a seat with the doors locked. Situation descriptions 301 are also configured to describe situations that are occurring simultaneously. Situation descriptions 301 are similar to gesture recognitions, as described with reference to the '754 application referred to above.

Database browser 303 compares the situation descriptions 301 with those that have been previously stored in the database of situation descriptions 302, to determine which situations may be relevant. This process uses the instruction controller 208 for input in determining which situations are relevant for comparison by the database browser 303 in the database of situation descriptions 302. The review of the database of situation descriptions results in a list of identified situations 304 that occur simultaneously and need to be reviewed by the situation controller 207.

Figure 4:
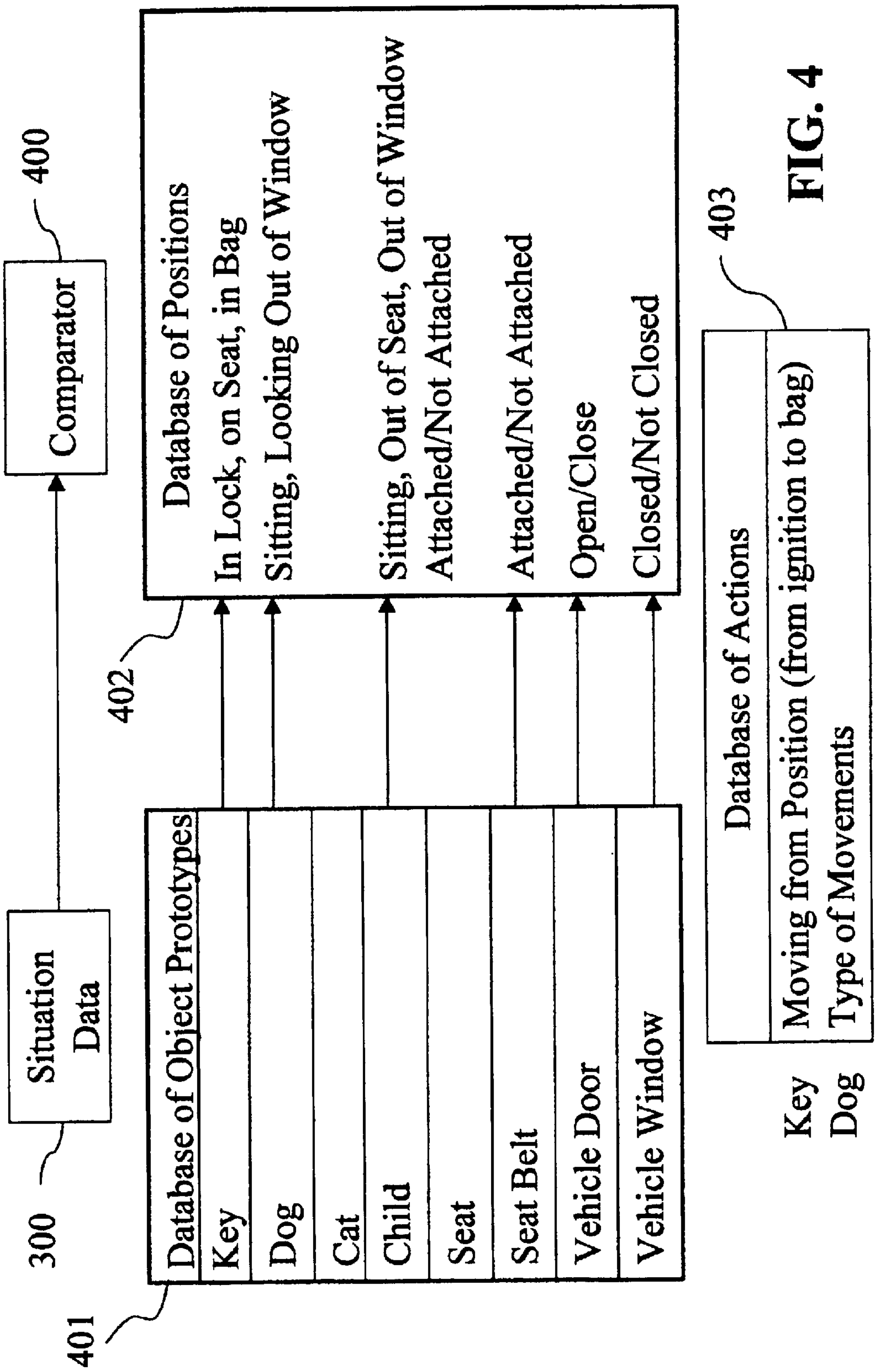
FIG. 4 is a block diagram illustrating further components associated with a situation definer.

FIG. 4 is a block diagram illustrating components associated with the situation descriptions 301. Situation data 300 is entered into a comparator 400. Comparator 400 compares the situation data 300 with stored data to determine which situation is presently occurring. A database of object prototypes 401 stores images such as a key, dog, cat, child, seat, seat belt, vehicle door, and vehicle window, along with images of any other objects that may be present in a vehicle. A database of physical positions 402 associated with the various objects includes positions such as, for example, keys may be in the ignition, door lock or on the seat or armrest; a pet may be sitting, whimpering, barking, meowing, or looking out of the window; a child may be seated, out of its seat, or putting its arm out of the window; the seat belt may be attached or not attached; and the vehicle doors and windows may be open or shut. Each object in the database of object prototypes 401 includes a corresponding number of possible positions as indicated in the database of positions 402. A database of actions 403 relates the objects and their positions. An exemplary action is a key moving from the ignition to a bag. This information assists the comparator 400 in evaluating the status of the various components within the vehicle. For example, for the preceding example the comparator will provide an alert indication to the effect that the "key was removed from the ignition and left in a bag on the driver's seat."

Therefore, the situation descriptions 301 block includes elements which compare various objects with associated positions to formulate the situation descriptions which are included in situation descriptions 301. Thereafter, the database browser 303 compares the situation descriptions 301 with those that have been previously stored in the database of situation descriptions 302, to determine which situations may be relevant.

Figure 5:
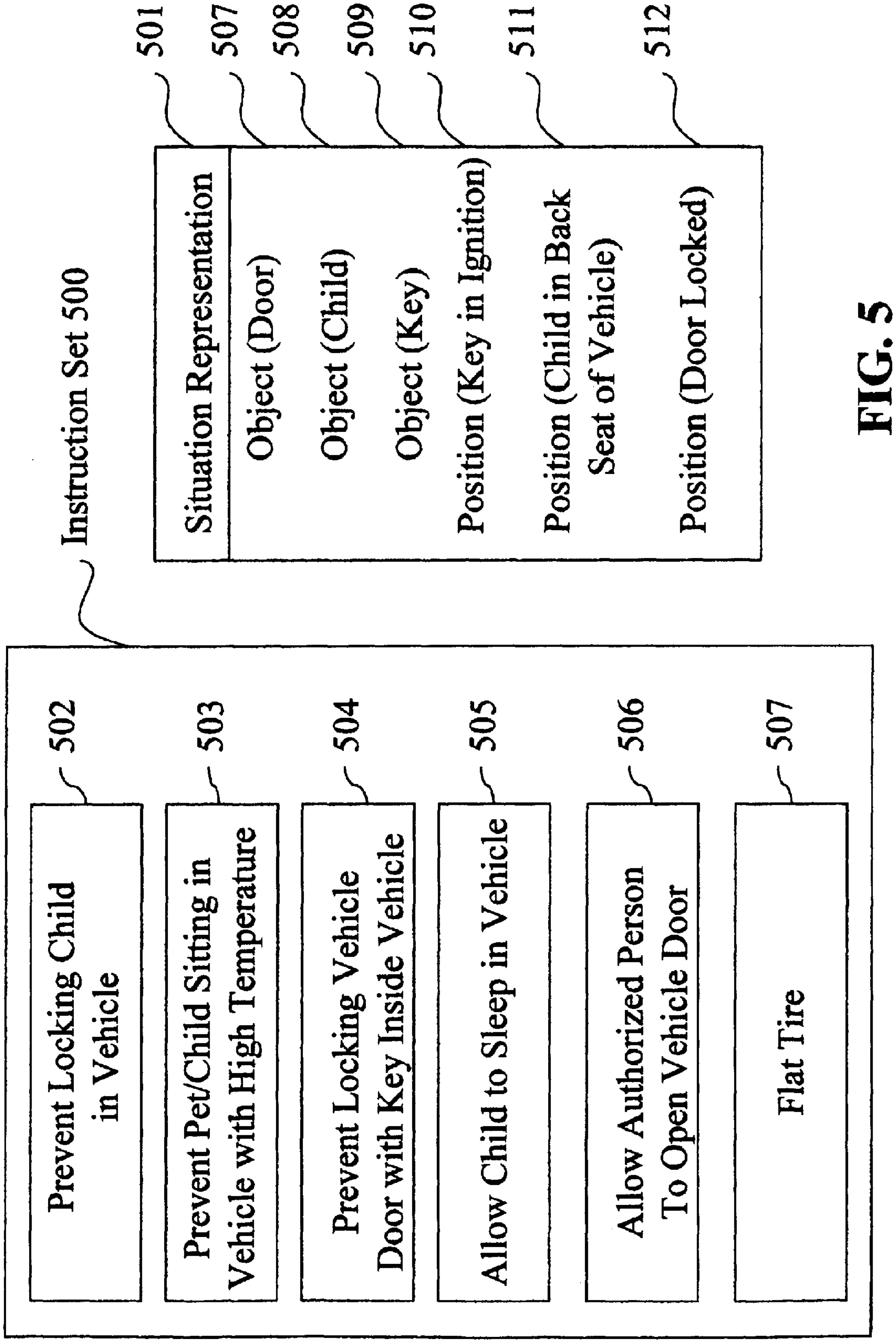
FIG. 5 is a block diagram illustrating components associated with an instruction controller.

FIG. 5 is a block diagram illustrating components associated with the instruction controller 208. The instruction controller 208 provides a list of situations that must be analyzed by the situation definer 206. The owner of the vehicle may take advantage of preprogrammed (default) settings in the instruction controller 208 for use with the artificial passenger 100, or it is contemplated that the specifications associated with the instruction controller 208 may be determined and changed by the owner. It is further contemplated that such changes may be made directly to the device or via a network connection. An instruction set 500 gives general instructions that are rendered in sentences or a particular grammatical format. Instructions include, for example, "prevent locking the child in the vehicle" as shown in block 502, "prevent pet/child from sitting in vehicle with high temperatures" as shown in block 503, "prevent locking vehicle door with the key inside vehicle" as shown in block 504, "allow the child to sleep in the vehicle" as shown in block 505, "allow authorized person to open vehicle door" as shown in block 506, or the vehicle will notify the driver that a tire is losing air pressure or is becoming flat as shown in block 520.

A more descriptive representation of the various situations that are encountered by the artificial passenger 100 are provided by situation representation 501. The artificial passenger 100 recognizes the situation by at least one of two modes. That is, the artificial passenger 100 recognizes objects, and positions of those objects. For example, objects include a door as shown in block 507, a child as shown in block 508, and a key as shown in block 509. Exemplary positions include a key in the ignition as shown in block 510, child in the back seat of the vehicle as shown in block 511, a door in the locked position as shown in block 512.

Figure 6:
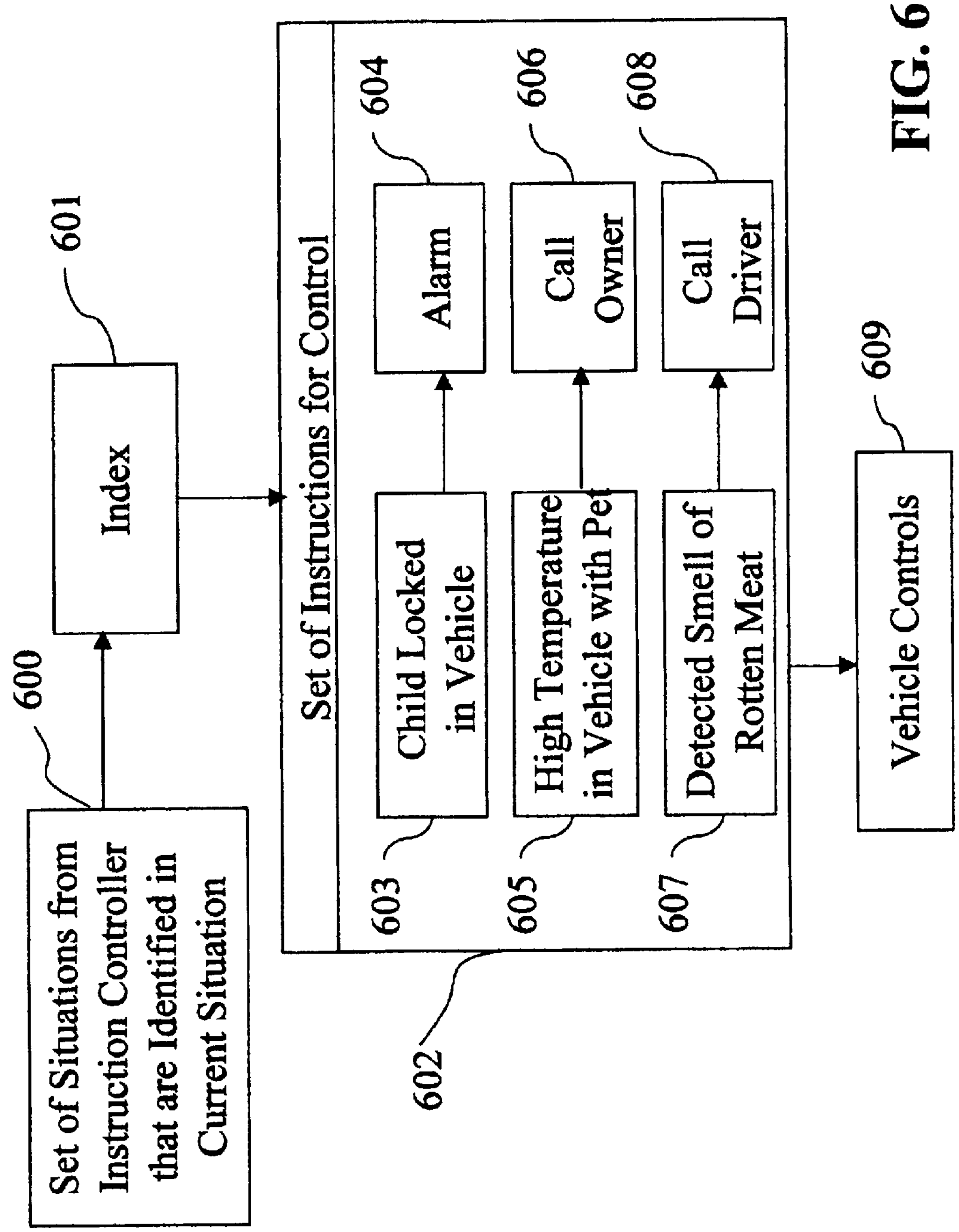
FIG. 6 is a block diagram illustrating components associated with a situation controller.

FIG. 6 is a block diagram illustrating components associated with the situation controller 207 including a set of situations from the instruction controller that are identified in the current situation 600. An index of the situations is contained in block 601. A set of instructions 602 control various functions of the vehicle, in response to a particular situation. For example, where a child has been locked in a vehicle 603, an alarm 604 is activated. If a child is still in the vehicle, it is also contemplated that the artificial passenger 100 has a plurality of options such as, for example, not allowing the doors to lock or notifying the driver via an alarm indication while the doors are closing. Another example includes a situation where a pet is in the vehicle and the temperature exceeds a predetermined temperature 605. In that case, the artificial passenger 100 will call the owner 606 to notify him or her of the situation and await further instructions. The artificial passenger 100 has the ability to utilize GPS technology to locate the owner if the mode of communication is not available. Alternatively, it is contemplated that a call is made to a special service that will send an authorized representative in place of the owner to address the situation.

The artificial passenger 100 also has the capability to detect the scent of groceries (e.g., rotten meat or spoiled milk) as shown in block 607. In that case, the artificial passenger 100 will call the driver as shown in block 608 and await instructions. The situation controller 207 is operatively connected to the vehicle controls 609. Thus, artificial passenger 100 is capable of causing changes to the vehicle controls 609 in response to a plethora of situations it may be presented with. The vehicle controls 609 include, for example, locking and unlocking doors and opening and closing windows.

Figure 7:
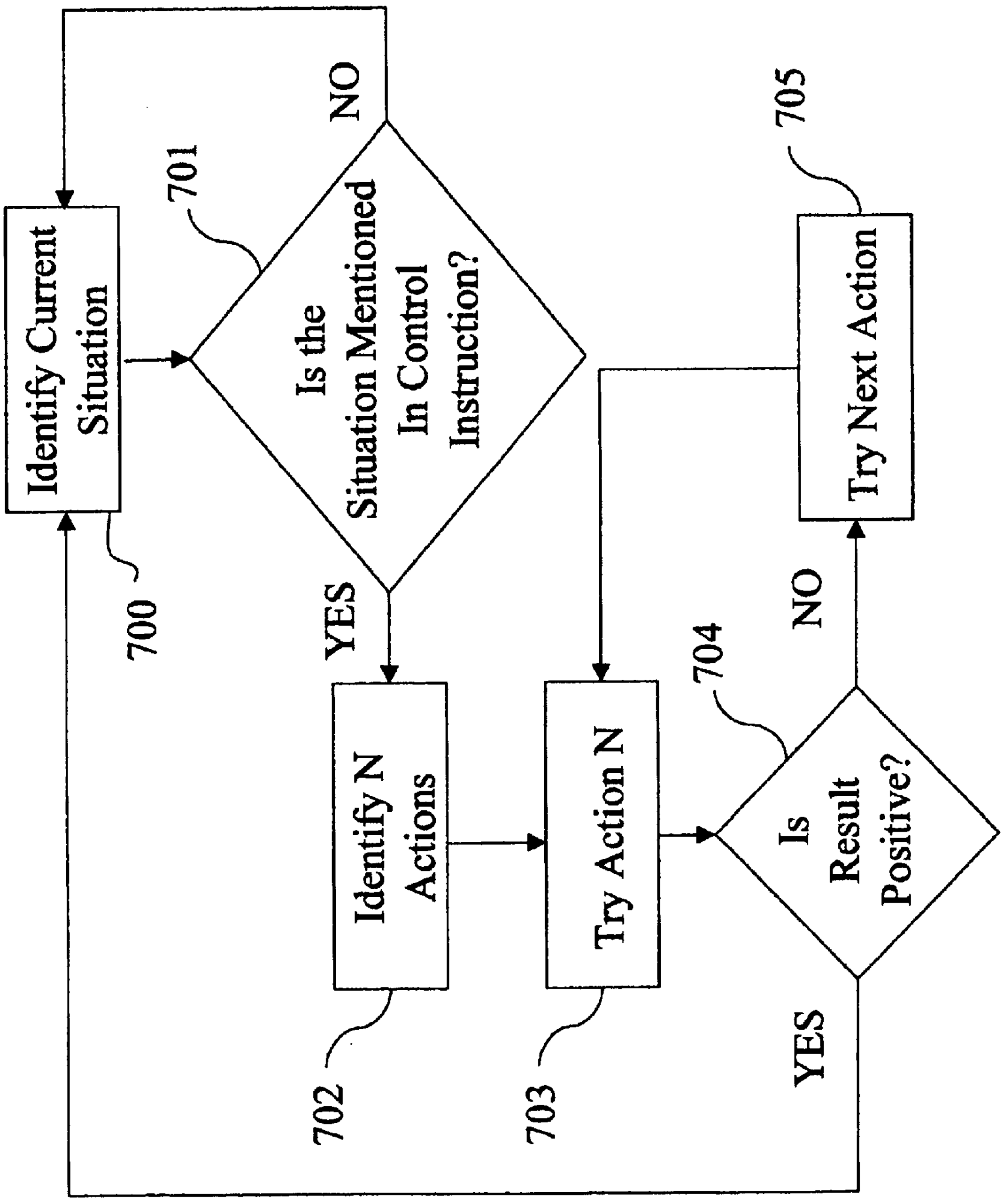
FIG. 7 is a flow diagram illustrating a vehicle monitoring process.

FIG. 7 is a flow diagram illustrating a vehicle monitoring process in accordance with an embodiment of the present invention. Step 700 identifies the current situation. Step 701 checks to see if the situation which has been identified in step 700 is mentioned in control instructions. If the situation is not mentioned in a set of control instructions, then the vehicle monitoring process again attempts to identify the current situation in step 700. If the situation is mentioned in a control instruction, then N number of corresponding actions are identified in step 702. In step 703, the artificial passenger executes the first of the N actions. In step 704, the situation is evaluated to determine whether the action, which was executed in step 703, had a positive effect on the situation. If a positive result was not obtained in step 704, the next N action is executed, as indicated in block 705. Once a positive result is obtained in step 704, the process is started over at step 700 to determine whether any additional situations exist.

Figure 8:
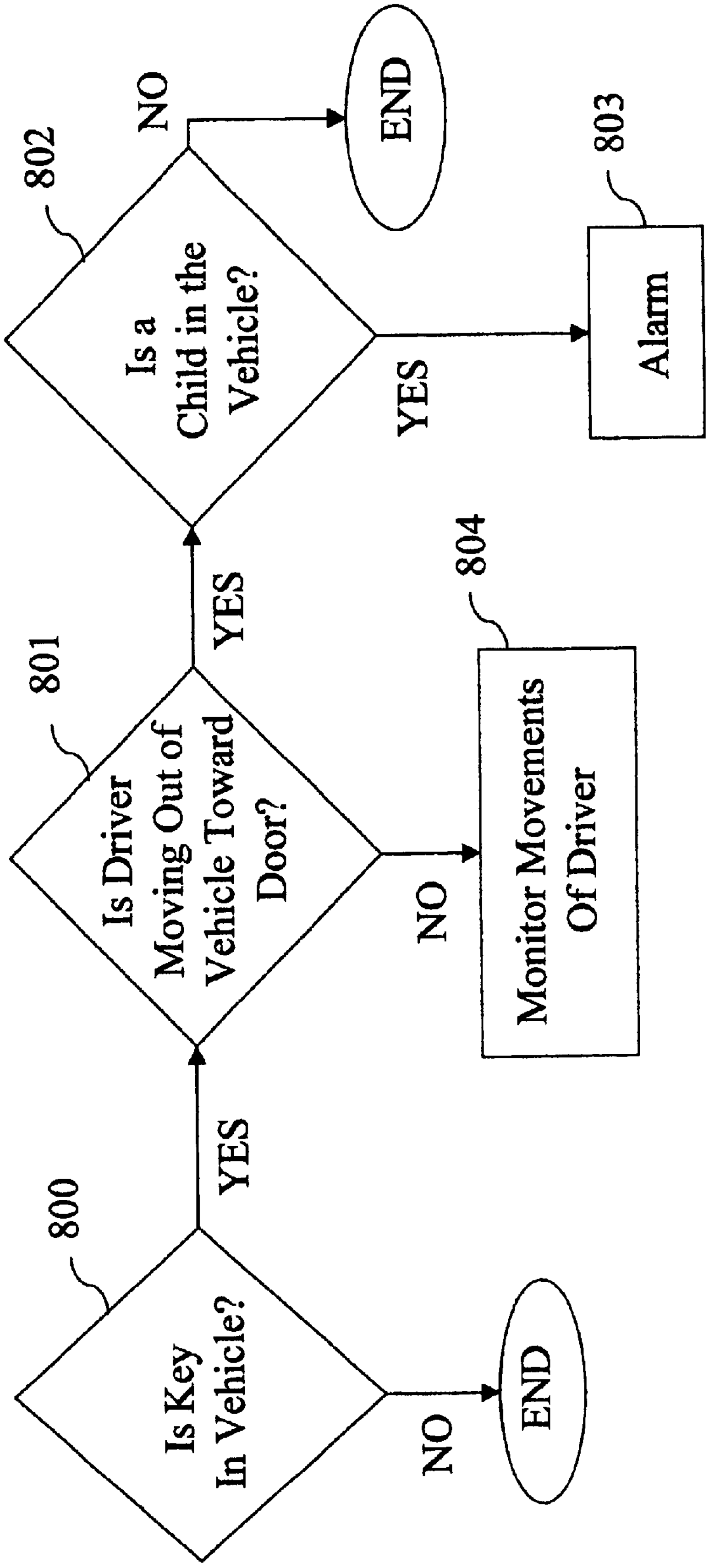
FIG. 8 is a flow diagram illustrating a key loss prevention process.

FIG. 8 is a flow diagram illustrating another embodiment of the present invention. More specifically, FIG. 8 illustrates an embodiment of the present invention wherein the artificial passenger 100 sounds an alarm to prevent a key and/or child from becoming locked in the vehicle. First, step 800 checks to determine whether the key is in the vehicle, i.e., on the seat, armrest, or on the floor somewhere. If the key is not in the vehicle, it is presumed that the owner has the key and therefore will not lock the key in the car. In this situation, no additional checks need to be performed. If the key is determined to be in the vehicle, the system checks to see if the driver is moving out of the vehicle, in step 801. If the driver is not moving out of the vehicle, the system continues to monitor the driver in step 804. If the driver is moving opt of the vehicle, the system checks, in block 802, to determine whether there is a child in the vehicle. If there is no child in the vehicle, the system notifies the driver that the keys are in the vehicle. If a child is in the vehicle, an alarm will sound, and the driver will be immediately notified that a child is in the vehicle.

Figure 9:
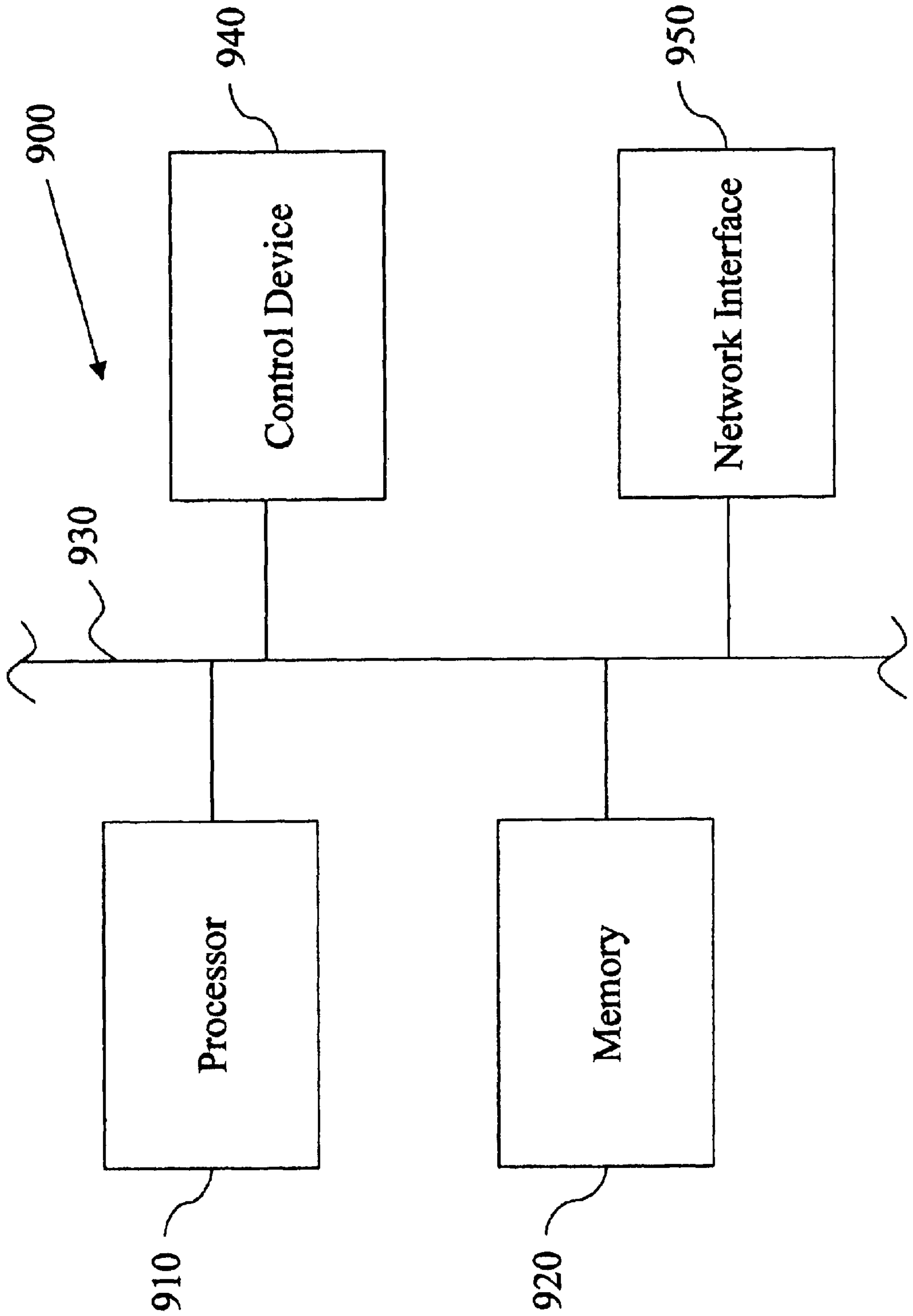
FIG. 9 is a block diagram illustrating a processing device for use in accordance with an embodiment of the present invention.

FIG. 9 shows an example of a processing device 900 that may be used to implement, e.g., one or more computer software programs for executing the functions of the present invention. The device 900 includes a processor 910 and a memory 920 which communicate over at least a portion of a set 930 of one or more system buses. Also utilizing at least a portion of the set 930 of system buses are a control device 940 and a network interface device 950. The processing device 900 may represent, e.g., portions or combinations of one or more of the artificial passenger, notification server, a desktop computer or any other type of processing device for use in implementing at least a portion of the functions in accordance with the present invention. The elements of the processing device 900 may correspond to conventional elements of such devices.

For example, the processor 910 may represent a microprocessor, central processing unit (CPU), digital signal processor (DSP), or application-specific integrated circuit (ASIC), as well as portions or combinations of these and other processing devices. The memory 920 is typically an electronic memory, but may comprise or include other types of storage devices, such as disk-based optical or magnetic memory. The control device 940 may be associated with the processor 910. The control device 940 may be further configured to transmit control signals, e.g., to open or close the windows in the vehicle.

The techniques of the present invention described herein may be implemented in whole or in part using software stored and executed using the respective memory and processor elements of the processing device 900. For example, the techniques may be implemented at least in part using one or more software programs stored in memory 920 and executed by processor 910. The particular manner in which such software programs may be stored and executed in device elements such as memory 920 and processor 910 is well understood in the art and therefore not described in detail herein.

It is contemplated that the network interface 950 facilitates transmission of a message in accordance with the present invention. It should be noted that the processing device 900 may include other elements not shown, or other types and arrangements of elements capable of providing the function of the present invention described herein.

Although the illustrative embodiments of the present invention have been described herein with reference to the accompanying drawings, it is to be understood that the invention is not limited to those precise embodiments, and that various other changes and modifications may be made by one having ordinary skill in the art without departing from the scope or spirit of the invention. For example, the artificial passenger may be configured to be operatively connected to a carbon monoxide detector to monitor the carbon monoxide level within the vehicle and to take corrective actions (e.g., open a window), if necessary. All such changes and modifications are intended to be included within the scope of the invention as defined by the appended claims.

What is claimed is:

1. A situation controller for a vehicle, the situation controller comprising:

an image monitor for monitoring images associated with one or more items within the vehicle;

a processing device coupled to the image monitor, capable of defining situations through item identification data, item position data, and item action data;

means for communicating a message relating to the one or more monitored items, wherein the content of the message is determined by the processing device based at least in part on the one or more monitored items; and a controller, coupled to the processing device, for controlling at least one function of the vehicle in response to the one or more monitored items.

2. Th situation controller as recited in claim 1, wherein the means for communicating a message comprises an interactive communication system that is capable of communicating with at lest one person regarding the items in the vehicle.

3. Th situation controller as recited in claim 2, wherein the interactive communication system comprises communicating with the at least one person via at least one of a telephone, e-mail and a pager.

4. The situation controller as recited in claim 1, wherein the at least one function of the vehicle comprises cine or more of opening and closing a window, locking and unlocking a door, sending an alarm to driver, preventing a door from closing, providing control of the vehicle remotely.

5. The situation controller as recited in claim 1, wherein the controller controls the at least one function of the vehicle in response to at least one of the message and a response to the message.

6. The situation controller as recited in claim 1, further comprising at least one sensor, coupled to an input of the processing device, for sensing a situation associated with the automobile.

7. The situation controller as recited in claim 6, wherein the at least one sensor comprises at least one of a microphone, a thermometer, and an odor sensor.

8. The situation controller as recited in claim 1, wherein the processing device further comprises a network interface to facilitate transmission of a message.

9. The situation controller as recited in claim 1, wherein the processing device comprises a processor an memory, wherein software for the situation controller is stored in the memory and executed by be processor.

10. The situation controller as recited in claim 1, further comprising an instruction controller, coupled to the processing device, for defining a hierarchy of relevant importance associated with the message.

11. Th situation controller as recited in claim 1, further comprising at least one second image monitor for monitoring items outside of the vehicle.

12. The situation controller as recited in claim 1, wherein the at least one function of the vehicle is a corrective action with respect to an undesirable situation.

13. The situation controller as recited in claim 1, wherein the at least one function of the vehicle is a vehicle alarm when the processing device detects people in a vicinity of the vehicle.

14. The method as recited in claim 1, wherein the means for communicating a message notifies the driver that the keys were left in a particular spot in the vehicle.

15. The situation controller of claim 1, wherein the processing device identifies items through image recognition.

16. The situation controller of claim 1, wherein the processing device determines if a pet left in the vehicle is irritable.

17. The method of claim 1, wherein the at least one function comprises opening a window if a pet is left in the vehicle and the temperature is too high.

18. The situation controller of claim 1, wherein the processing device identifies a person outside of the vehicle.

19. The situation controller of claim 1, wherein the processing device determines when a sleeping child awakens.

20. The situation controller of claim 1, wherein the means for communicating a message comprises a speech recognition device.

21. The situation controller of claim 1, wherein the situation controller of the vehicle communicates with a situation controller of another vehicle.

22. A method of controlling at least one function of a vehicle, the method comprising the steps of:

transmitting a message, the message capable of comprising item identification data, item position data, and item action data, relating to a situation in the vehicle, to a processing device;

processing the message in the processing device and transmitting the processed data to a situation definer;

defining the situation in the situation definer and transmitting the defined situation to a situation controller;

recommending a course of action to be taken with respect to vehicle controls in view of the defined situation;

communicating a message including the defined situation and recommended course of action; and transmitting a signal to the vehicle controls to control a function of the vehicle.

23. The method as recited in claim 22 wherein the communicating step includes the step of communicating a message to a driver of the vehicle indicating that a key for the vehicle ignition was le inside the vehicle.

24. The method as recited in claim 22, wherein the communicating step includes the step of communication a message to a driver of the vehicle indicating that a child was left in the vehicle and a temperature within the vehicle has reached a predetermined temperature value.

25. The method as recited in claim 22, wherein a sensor is positioned within the vehicle for sensing at leas one situation in the vehicle.

26. The method as recited in claim 22, wherein the data is transmitted to the processing device from a least one of a video data source and an audio data source.

27. The method as recited in claim 22, further comprising the step of defining a hierarchy of relevant importance associated with two or more situations that are defined in the situation definer.

28. An article of manufacture for controlling at least one function of a vehicle, the article comprising a machine readable medium containing one or more programs which when executed implement the steps of:

transmitting a message, the message capable of comprising item identification data, item position data, and item action data, relating to a situation in the vehicle, to a processing device;

processing the message in the processing device and transmitting the processed data to a situation definer;

defining the situation in the situation definer and transmitting the defined situation to a situation controller;

recommending a course of action to be taken with respect to the vehicle controls in view of the defined situation;

communicating a message including the defined situation and recommended course of action; and transmitting a signal to vehicle controls to control a function of the vehicle.

* * * * *

UNITED STATES PATENT AND TRADEMARK OFFICE
CERTIFICATE OF CORRECTION

PATENT NO. : 6,792,339 B2
DATED : September 14, 2004
INVENTOR(S) : Sara H. Basson et al.

It is certified that error appears in the above-identified patent and that said Letters Patent is hereby corrected as shown below:

Column 10,
Line 17, after the word "device" insert -- , --
Lines 27, 31 and 62, delete "Th" and insert -- The --
Line 36, delete "cine" and insert -- one --
Line 55, delete "an" and insert -- and --

Column 12,
Line 6, delete "le" and insert -- left --
Line 8, delete "communication" and insert -- communicating --
Line 13, delete "leas" and insert -- least --

Signed and Sealed this

Seventh Day of December, 2004

JON W. DUDAS
*Director of the United States Patent and Trademark Office*